United States Patent
Sadiku

(10) Patent No.: US 12,395,030 B2
(45) Date of Patent: Aug. 19, 2025

(54) METHOD AND DEVICE FOR INTRODUCING INSULATED WINDING PACKETS INTO STATOR OR ROTOR GROOVES, AND STATOR OR ROTOR COMPRISING INSULATED WINDING PACKETS

(71) Applicant: Schaeffler Technologies AG & Co. KG, Herzogenaurach (DE)

(72) Inventor: Sadik Sadiku, Neuberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 243 days.

(21) Appl. No.: 18/016,883

(22) PCT Filed: Jul. 16, 2021

(86) PCT No.: PCT/DE2021/100624
§ 371 (c)(1),
(2) Date: Jan. 19, 2023

(87) PCT Pub. No.: WO2022/017562
PCT Pub. Date: Jan. 27, 2022

(65) Prior Publication Data
US 2023/0275483 A1    Aug. 31, 2023

(30) Foreign Application Priority Data
Jul. 22, 2020    (DE) .................. 10 2020 119 303.3

(51) Int. Cl.
*H02K 3/34*    (2006.01)
*H02K 15/10*    (2025.01)

(52) U.S. Cl.
CPC ............. *H02K 3/345* (2013.01); *H02K 15/10* (2013.01)

(58) Field of Classification Search
CPC ...... H02K 15/10; H02K 15/02; H02K 15/024; H02K 15/105; H02K 3/345; Y10T 29/53152; Y10T 29/49009
(Continued)

(56) References Cited

U.S. PATENT DOCUMENTS 6,657,352 B1 *  12/2003  Asao ................ H02K 3/28
                                                310/180
7,194,794 B2    3/2007   Arendes et al.
(Continued)

FOREIGN PATENT DOCUMENTS

DE    102016124534 A1 *  6/2017  .......... H02K 15/064
DE    102016212382 A1     1/2018
(Continued)

OTHER PUBLICATIONS

Machine Translation of WO_2009102015_A1 (Year: 2009).*
Machine Translation of DE 102018203331 A1 (Year: 2019).*
Machine Translation of DE 102016124534 A1 (Year: 2017).*

*Primary Examiner* — Alexander A Singh
*Assistant Examiner* — Charlie Frank Mann, Jr.
(74) *Attorney, Agent, or Firm* — Price Heneveld LLP

(57) ABSTRACT

A method for introducing an insulating layer between stator or rotor grooves and for introducing winding packets with wire webs of coil wires of a coil winding is provided. The coil winding may be inserted into the stator or rotor grooves from a transfer tool. The method has the steps of: inserting insulating layers into transfer grooves of the transfer tool, wherein at least one section of each of the insulating layers lies radially outside of the transfer groove; transferring the wire webs of the winding packets into the transfer grooves; closing the insulating layers by folding the sections in the direction of the wire webs of the winding packets and fixing the sections in the folded position of the sections; and inserting the winding packets into respective stator or rotor (Continued)

grooves such that the folded sections are arranged between groove bases of the stator or rotor grooves and the wire webs of the winding packets.

10 Claims, 4 Drawing Sheets

(58) Field of Classification Search
USPC .......................................................... 29/596
See application file for complete search history.

(56) References Cited

U.S. PATENT DOCUMENTS

| | | |
|---|---|---|
| 2003/0127936 A1 | 7/2003 | Katou et al. |
| 2009/0267441 A1 | 10/2009 | Hiramatsu et al. |
| 2011/0283523 A1 | 11/2011 | Shives et al. |
| 2012/0117790 A1* | 5/2012 | Carpentier ........... H02K 15/066 |
| | | 29/734 |
| 2014/0042836 A1 | 2/2014 | Shiga et al. |
| 2018/0006512 A1 | 1/2018 | Tsuiki et al. |

FOREIGN PATENT DOCUMENTS

| | | | |
|---|---|---|---|
| DE | 102019003258 A1 | 7/2019 | |
| DE | 102018203331 A1 * | 9/2019 | ............. H02K 15/10 |
| JP | 2009131019 A | 6/2009 | |
| WO | WO-2009102015 A1 * | 8/2009 | ......... H02K 15/0471 |
| WO | 2011000103 A1 | 1/2011 | |

* cited by examiner

METHOD AND DEVICE FOR INTRODUCING INSULATED WINDING PACKETS INTO STATOR OR ROTOR GROOVES, AND STATOR OR ROTOR COMPRISING INSULATED WINDING PACKETS

CROSS-REFERENCE TO RELATED APPLICATIONS

This application is the U.S. National Phase of PCT Appln. No. PCT/DE2021/100624 filed Jul. 16, 2021, which claims priority to DE 102020119303.3 filed Jul. 22, 2020, the entire disclosures of which are incorporated by reference herein.

TECHNICAL FIELD

The disclosure relates to a method for introducing insulated winding packets into rotor or stator grooves, a device for this and a stator or rotor comprising such insulated winding packets.

BACKGROUND

Stators or rotors of electrical machines are equipped with electrical conductors. These conductors are drawn into grooves in the stator or rotor bodies, where they form coils consisting of coil windings. A coil winding has areas (wire webs) running in the stator or rotor grooves and areas (winding heads) running outside the stator or rotor grooves, which form a transition of the electrical conductors from one stator or rotor groove into another stator or rotor groove. The wire webs in a stator or rotor groove form a winding packet.

The wire webs must be insulated from the stator or rotor body to prevent voltage breakdown and leakage currents. For this purpose it is known to insulate the winding packets from the stator or rotor groove with an insulating material.

DE 10 2016 124 534 A1 shows a method for inserting an insulating film between at least one electrical conductor and a groove. Here, the insulating film is first inserted into the groove. The groove is then filled with the electrical conductors, starting at the base of the groove. The insulating film is then folded over in the groove and at the open end of the groove, so that the insulating film encloses the electrical conductor(s) introduced in the groove on all sides. This method requires an extremely precise insertion of the electrical conductors, whereby it must be avoided that the insulating film already inserted in the groove is damaged during insertion. It must also be prevented that a voltage breakdown occurs in the area of the groove bases due to the potential difference of the current flowing through the coil on the stator or rotor body. According to the state of the art, a sufficiently strong insulating film would be used for this, which absorbs the mechanical forces when the electrical wires are finally inserted into the stator or rotor body without failing, while at the same time providing a correspondingly high insulating effect in order to close the creepage distance between the electrical wires and the stator or rotor body. The provision of a sufficiently strong insulating film is at the expense of the filling space available for the electrical conductors in the respective stator or rotor groove. The problem here is that the sensitive insulating layer is not damaged during the assembly process of the coil winding in the stator or rotor grooves.

SUMMARY

Proceeding from this, the object on which the present disclosure is based can be seen as providing a method and a device with the aid of which effective insulation of winding packets in relation to the stator or rotor bodies can be reliably produced with minimal space requirements. In this case, the fill factor for a stator or rotor with inserted and correspondingly insulated winding packets should not be significantly reduced.

The main features of the disclosure are described herein and claimed.

The disclosure relates to a method for introducing an insulating layer between stator or rotor grooves and for introducing winding packets made from wire webs of coil wires of a coil winding, the coil winding being inserted into the stator or rotor grooves from a transfer tool, having the following method steps: The method has the steps of: inserting insulating layers into transfer grooves of the transfer tool, wherein at least one section of each of the insulating layers lies radially outside of the transfer groove; transferring the wire webs of the winding packets into the transfer grooves; closing the insulating layers by folding the sections in the direction of the wire webs of the winding packets and fixing the sections in the folded position of the sections; and inserting the winding packets into respective stator or rotor grooves such that the folded sections are arranged between groove bases of the stator or rotor grooves and the wire webs of the winding packets.

The method according to the disclosure has the advantage that the insulation of the winding packets in the transfer tool can be carried out much more easily and in a less error-prone manner. By inserting the wire webs of the winding packets, which are already surrounded by the insulating layer, into the rotor or stator grooves, the respective insulating layer and also the respective winding packet are subjected to less stress. This advantageously increases the quality of the coil winding produced through insulation with fewer damaged areas. In addition, the material requirement for insulation material for the insulating layer can be optimized with regard to its layer thickness. Accordingly, in one embodiment of the disclosure, it can be provided that the thickness of the insulating layer is in the range from 0.12 to 0.15 mm. Furthermore, the fact that the insulation of the winding packets is already completed before insertion into the rotor or stator grooves ensures that damage to the winding packet is avoided during insertion, in particular by a joining mandrel of the transfer tool. The joining mandrel is provided in the transfer tool to transfer the finished winding packets from the transfer tool into the rotor or stator grooves.

Typically, the drawing in of the winding packets is determined by the fact that the grooves run in a cylindrical stator or rotor body and are open radially inwards towards one another. In this way, the winding packets can be inserted from the transfer tool in a particularly simple manner if the transfer tool has transfer grooves which are open radially outwards. In order to achieve a high degree of filling of the stator or rotor grooves, it is also advantageous if the coil winding is a flat-wire winding. The space available from the stator or rotor grooves, which are generally rectangular in cross-section, is ideally utilized by using flat wires in contrast to the use of round wires. In one variant of the disclosure it is conceivable that the insulating layer with the sections rests completely in the respective transfer groove of the transfer tool. In this case, for the transfer of the winding packets into the transfer grooves, it must be ensured that the insulating layer lying in the respective transfer groove is not damaged and/or dragged along by the winding packets. According to an optional development of the method, it is provided that the winding packets are transferred so far into the transfer grooves of the transfer tool that each transfer groove has a radially outer area in which there is no winding packet and this area is at least on one side and at least partially covered by a section of an insulating layer. Furthermore, it can be provided for the method that the radially outer area of the transfer groove is at least partially filled by a spacer after the transfer of the winding packets. There is also the possibility that the transfer grooves are completely filled by the winding packet and the insulating layer.

According to one embodiment of the method, it is provided that the respective sections of the insulating layer in a transfer groove after the transfer of the wire webs of the winding packet into the respective transfer groove have a total radial overhang that is greater than the width of the transfer groove. This ensures that after the sections have been folded, the insulating layer completely encloses the winding packet in the transfer groove and, in the inserted state, also in the stator or rotor groove.

According to one embodiment of the method, the sections are fixed in the folded position via a fixing means. An adhesive or a layered adhesive material may be used as such a fixing means. The material itself can also have insulating properties. These measures result in the advantage that in the area of the groove bases of the stator or rotor body, where the fixed sections finally come to lie, there is more thorough insulation than an introduced insulating layer, and the creepage distance is thus further increased.

According to one embodiment of the method, it can be provided that when the insulating layers are closed in the transfer grooves, two sections are folded in an overlapping manner. This double layer results in a further increase in the creepage distance in the area of the groove bases of the stator or rotor body, so that the advantages mentioned above also come into play here.

According to an optional further development of the method, all wire webs of a winding packet are surrounded by the insulating layers in the transfer grooves before the winding packets are inserted. In a further development, it can be provided that the section of the insulating layer for each winding packet to be inserted is also fixed before the insertion. It can thus be ensured that before the insulating layer is drawn in, all the wire webs of the winding packet or all the areas lying in the transfer groove and to be drawn into the stator or rotor groove are surrounded by the insulating layer. This is particularly advantageous for the insertion of the winding packets into the stator or rotor grooves, since the winding packets are thus protected from damage by the insulating layer and are also held together by the insulating layer. As a result, there is a better insulation effect for the coil winding used in the stator or rotor body and, moreover, greater process reliability when inserting the coil winding.

An optional embodiment of the method results in the insulating layers being inserted in the transfer grooves in such a way that sections of the insulating layer alternately at least partially overlap on the radial outer sides of the transfer webs. For example, a section of a first insulating layer in a first transfer groove can lie directly against a transfer web lying between this transfer groove and an adjacent transfer groove. An insulating layer lying in the adjacent transfer groove also has a section which in this case overlies the section of the first transfer groove. This ensures that there is enough space provided for the sections. This enables the sections to have an extension that is sufficient to completely cover the width of the transfer grooves after folding in the direction of the winding packets.

A further optional embodiment of the method results in the insulating layers being formed from an endless material which radially surrounds the transfer webs and the transfer grooves of the transfer tool on all sides. Accordingly, according to a development of the method, a step is provided according to which the endless material is separated in the area of the transfer webs respectively. In particular, the separation takes place after the winding packets have been transferred into the transfer grooves. By using an endless material, the geometry of the transfer tool can be lined in a particularly advantageous manner, so that the transfer webs and the transfer grooves of the transfer tool are radially surrounded on all sides by the endless material. The individual insulating layers can then be produced by simply separating them in the axial direction—in relation to the essentially cylindrical transfer tool.

The disclosure further relates to a stator or rotor with a coil winding introduced in the stator or rotor grooves with winding packets made of wire webs, the stator or rotor grooves being completely insulated from the winding packets that lie in the stator or rotor grooves by an insulating layer, wherein the disclosure provides that the insulating layer has at least one section which is arranged in each stator or rotor groove between a groove base of the stator or rotor groove and the winding packet. This ensures that the winding packet is also insulated in the area of the base of the groove. Accordingly, in a development of the disclosure, it is provided that the section arranged between the groove base and the winding packet is fixed to a further section or to the winding packet via a fixing means. The fixing means can also be formed by an adhesive, which can be used to bond the sections to one another or to bond a section to the winding packet or to the insulating layer. In this way, the creepage distance in the area of the groove base of the stator or rotor groove is further optimized, as a result of which the stator or rotor achieves greater electrical security against voltage breakdown.

The disclosure also relates to a transfer tool for carrying out the method, wherein the transfer tool has a cylindrical shape with radially outwardly open transfer grooves and, between the transfer grooves, transfer webs are arranged, characterized in that a parting line is arranged on the radially outer side of the transfer webs. In a further embodiment it is provided that the parting line runs in the axial direction of the transfer tool. By providing a parting line, the sections of the respective insulating layer can be produced or shortened from an endless material, for example if the sections have a length greater than the width of the transfer groove or the winding packet after being folded in the direction of the winding packet. Adequate insulation of the winding packet is thus achieved in an advantageous manner, while excess material can be avoided. This has a particularly advantageous effect on the fill factor of the stator or rotor grooves.

BRIEF DESCRIPTION OF THE DRAWINGS

Further features, details and advantages of the disclosure are disclosed in the following description of exemplary embodiments with reference to the drawings. In the figures.

DETAILED DESCRIPTION

Figure 1A:
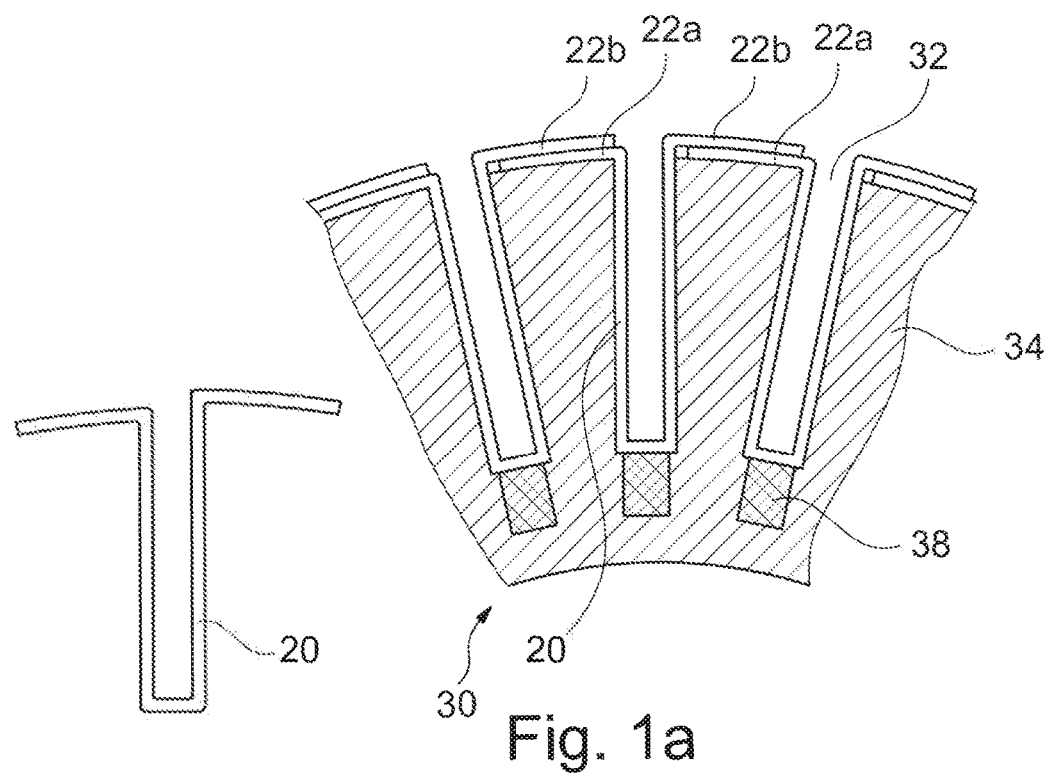
FIG. 1a: shows a schematic overview of the filling of the transfer grooves with the insulating layers in a first embodiment of the method.

FIG. 1a shows a schematic overview of the filling of transfer grooves 32 of a partially and schematically illustrated transfer tool 30 with insulating layers 20 in a first embodiment of the method. In this case, the insulating layers 20 are individually inserted into the respective transfer grooves 32 of the transfer tool 30. In this embodiment, the insulating layers 20 have sections 22a, b which protrude radially from the transfer grooves 32 of the transfer tool 32 and extend on an outer circumference of the transfer tool 30. The sections 22a, b of an insulating layer 20 protrude in the circumferential direction of the transfer tool 30 beyond the transfer webs 34 lying on both sides next to the transfer groove 32. This is repeated for each insulating layer 20 arranged in a transfer groove 32, with a section 22a of a respective insulating layer 20 lying under a section 22b of an adjacent insulating layer 20. It can also be seen in FIG. 1 that the transfer tool 30 has an insertion mandrel 38 in the base area of the transfer groove 32.

Figure 1B:
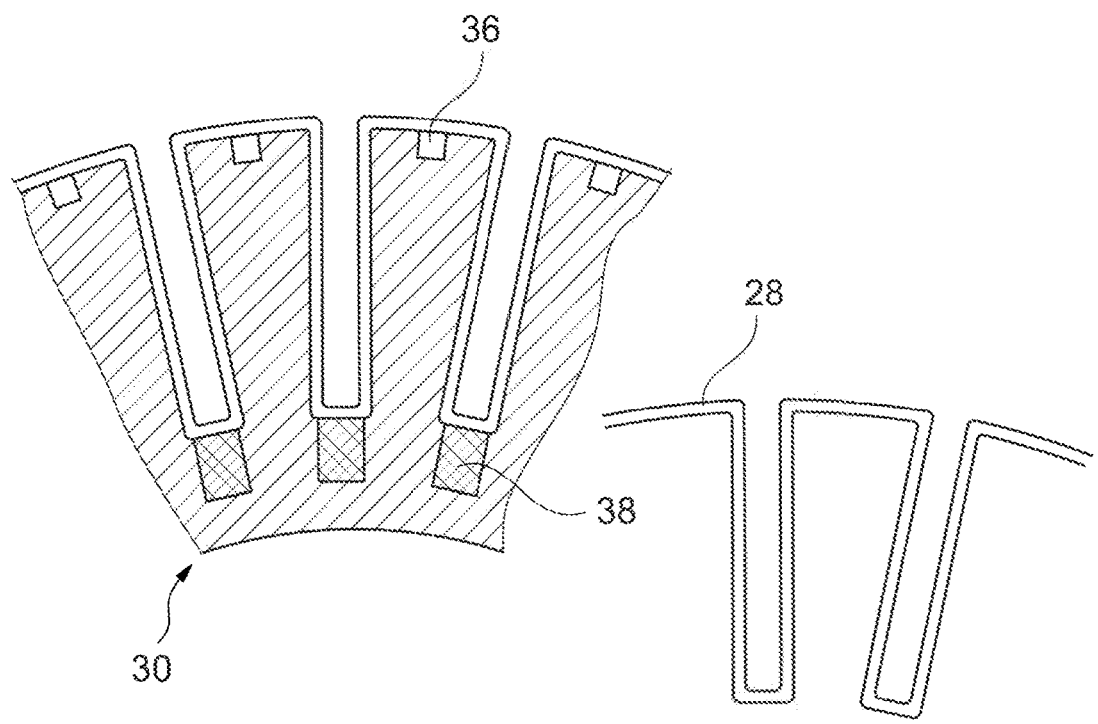
FIG. 1b: shows a schematic overview of the filling of the transfer grooves with the insulating layers in a further embodiment of the method.

FIG. 1b shows a schematic overview of the filling of transfer grooves 32 of a partially and schematically illustrated transfer tool 30 with insulating layers 20 in a further embodiment of the method. The transfer tool 30 corresponds to the transfer tool 30 described in accordance with FIG. 1a with the additional feature that a parting line 36 is arranged on each transfer web 34. The transfer tool 30 is essentially cylindrical and the parting line 36 runs in the axial direction on the transfer tool 30.

According to this embodiment of the method, the insulating layers 20 have not yet been formed. An endless material 28 is arranged on the transfer tool 30, wherein the endless material surrounds the transfer webs 34 and the transfer grooves 32 of the transfer tool 30 radially on all sides. The insulating layers 20 are formed as described in FIG. 2b.

Figure 2A:
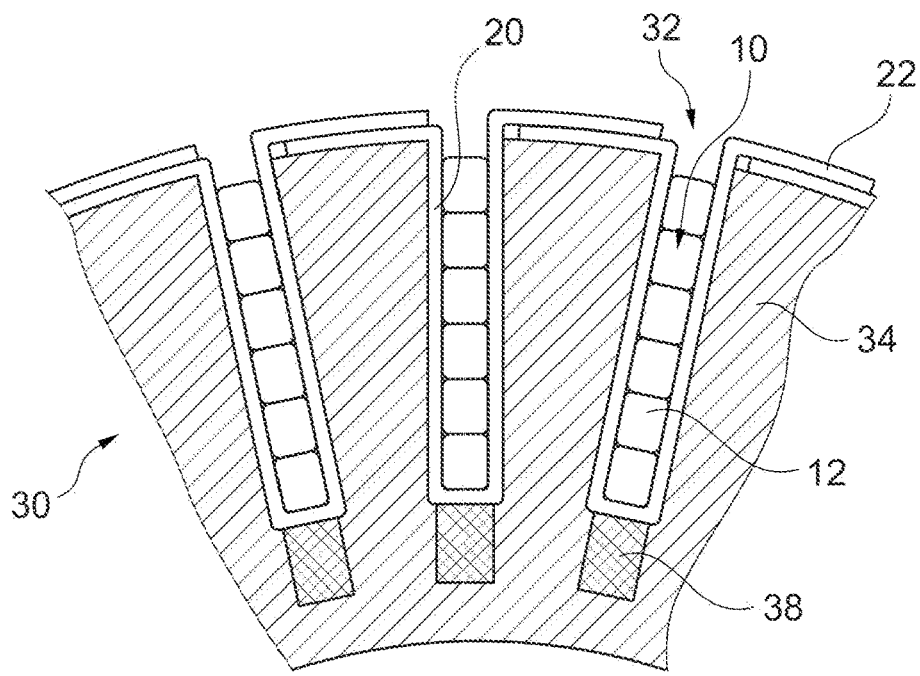
FIG. 2a: shows a schematic view of an intermediate step of the method according to a first embodiment, in which the winding packets are transferred into the transfer grooves.

FIG. 2a shows a schematic view of an intermediate step of the method according to the first embodiment, in which the winding packets 10 are transferred into the transfer grooves 32. The winding packets 10 have a plurality of wire webs 12 of coil wires, which are designed as flat wires. The winding packets 10 fill the transfer grooves 32, viewed from the base of the transfer grooves 32, together with the insulating layers 20 already introduced before the winding packets 10 are transferred.

Figure 2B:
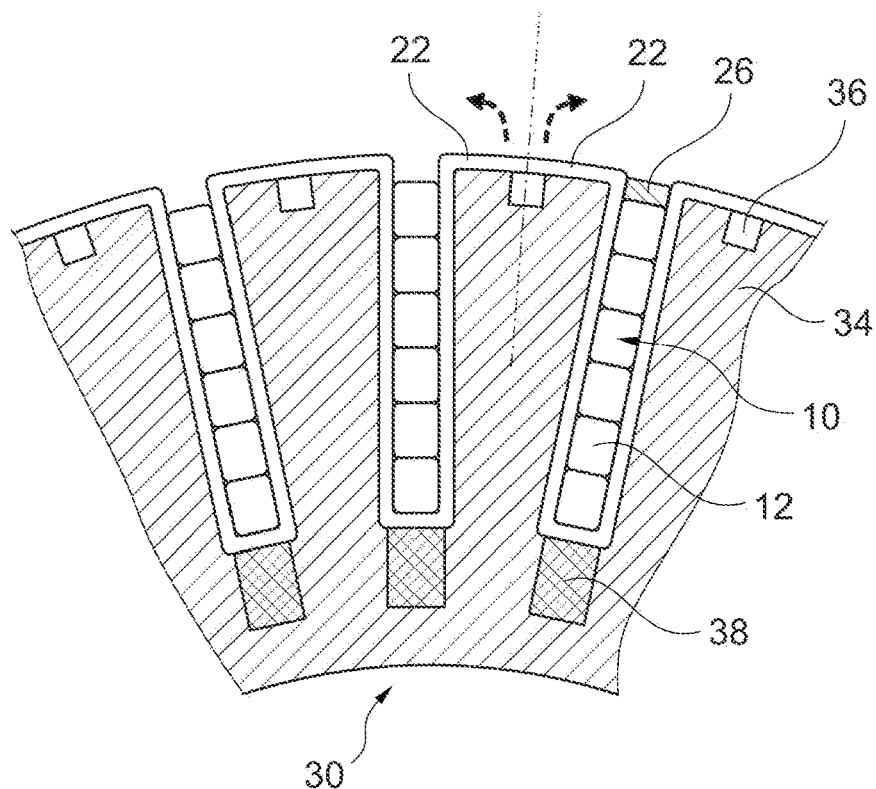
FIG. 2b: shows a schematic view of an intermediate step of the method according to a further embodiment, in which the winding packets are transferred into the transfer grooves.

FIG. 2b shows a schematic view of an intermediate step of the method according to the further embodiment, in which the winding packets 10 are transferred into the transfer grooves. This intermediate step essentially corresponds to the intermediate step from FIG. 2a, with the difference that the insulating layers 20 and the sections 22a, b radially protruding over the groove are formed by cutting the endless material 28 along the parting lines 36. The sections are then turned over in the direction of the winding packet according to the method and fixed there, as described in more detail for FIG. 3. In FIG. 2b it is also provided that a spacer 26 is placed in the transfer groove 32 from the outside on the winding packet 10 if the winding packet 10 does not completely fill the transfer groove 32. The spacer 26 has insulating properties and also contributes to the insulation of the winding packet 10 against a groove base 112 of a stator or rotor groove 110 when the winding packet 10 with the insulating layer 20 is inserted into the stator or rotor groove 110. Furthermore, the spacer 26 closes the insulation through the insulating layer 20 when the sections 22a, b, taken together, do not reach the width of the transfer groove 32 in terms of their length due to the cutting of the endless material 28.

Figure 3:
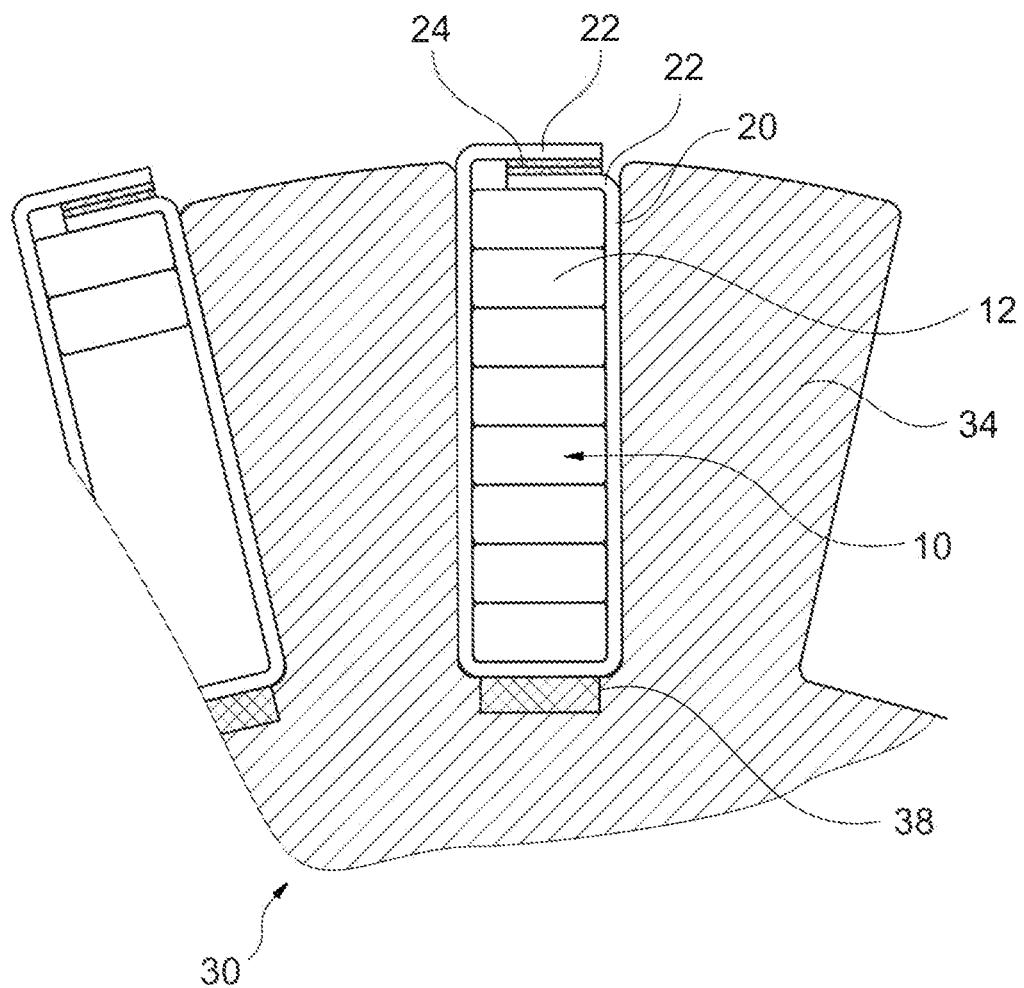
FIG. 3: shows a schematic view of an embodiment of the insulating layers produced according to the method around a winding packet in a transfer groove of a transfer tool.

FIG. 3 shows a schematic view of an embodiment of the insulating layers 20 produced by the method around a winding packet 10 in a transfer groove 32 of a transfer tool 30. The insulating layers 20 can either have been inserted into the transfer grooves 32 according to the first embodiment of the method according to FIGS. 1a and 2a, or have been produced according to the second embodiment of the method according to FIG. 2a, 2b by separating endless material 28 along parting lines 38. The sections 22a, b of the insulating layers 20 are already folded in the direction of the winding packet 10 in this representation. Furthermore, the sections are fixed to one another in the folded position by a fixing means 24. The folded insulating layer 20 protrudes slightly beyond the circumference of the transfer tool. It is also conceivable that the winding packet 10 together with the folded insulating layer 20 lies completely in the respective transfer groove 32 of the transfer tool 30.

The transfer groove 32 is radially brought into overlap with a stator or rotor groove 110 so that the radial openings of the transfer groove 32 and the stator or rotor groove 110 correspond. The entire above-described assembly of insulating layer 20 and winding packet 10 according to one of the embodiments, which lies in the transfer groove 32, is inserted from the transfer groove 32 into the stator or rotor groove 110 by means of the insertion mandrel 38. This insertion is repeated for each transfer groove 32 of the transfer tool 30.

Figure 4:
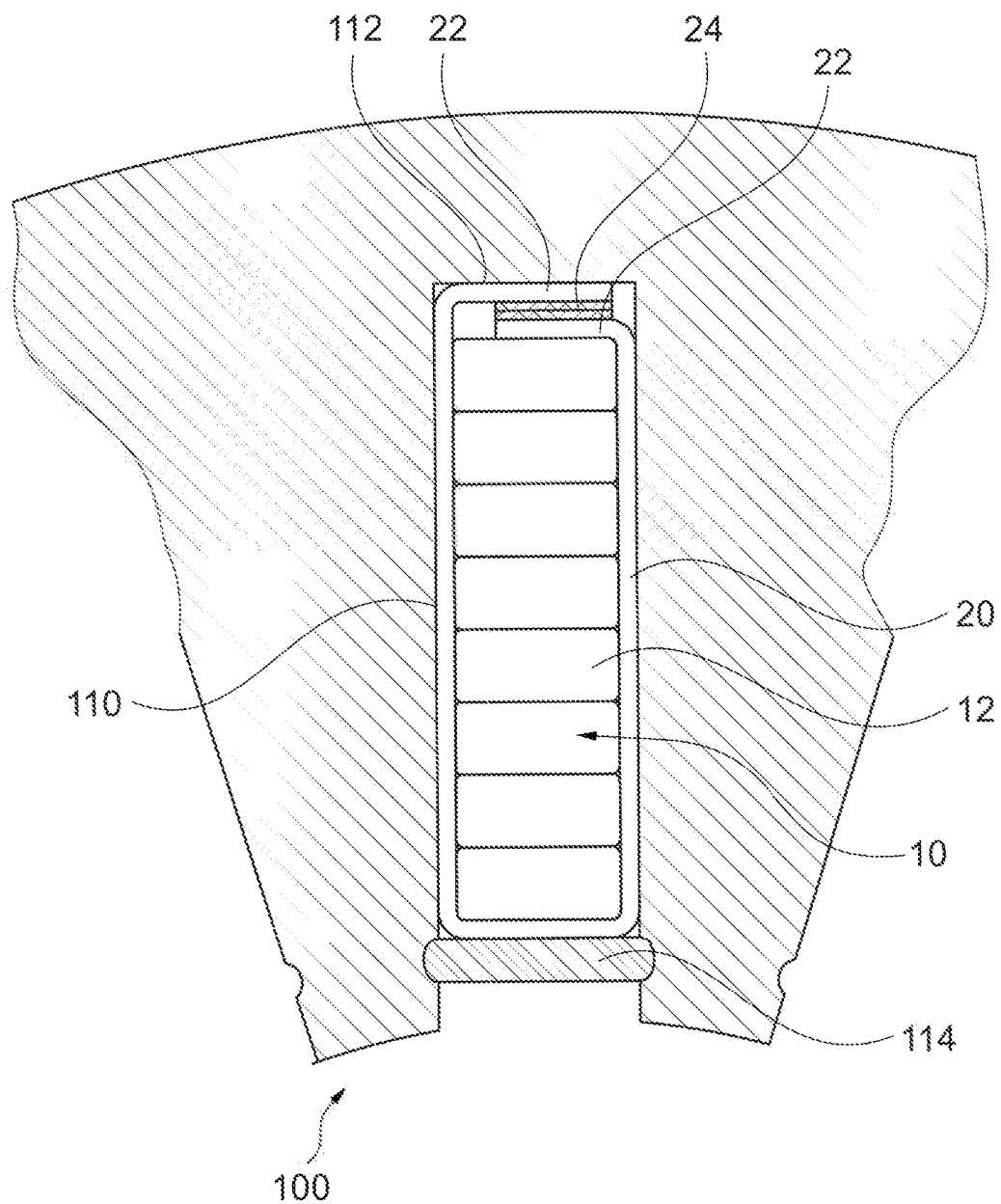
FIG. 4: a schematic view of a winding packet inserted into a rotor or stator groove with the insulating layer inserted according to the disclosure.

FIG. 4 shows a schematic view of a winding packet 10 inserted into a rotor or stator groove 110 with the insulating layer 20 introduced according to the disclosure. It can be seen that the sections 22a, b of the insulating layer rest against the groove base 112 of the stator or rotor groove 110. Furthermore, the winding packet 10 with the insulating layer 20 is secured against sliding out of the stator or rotor groove 110 by a cover slide part 114 which engages behind an undercut of the stator or rotor groove 110.

LIST OF REFERENCE SYMBOLS

10 Winding packet
12 Wire web
20 Insulating layer
22a, b Sections
24 Fixing means
26 Spacer
28 Endless material
30 Transfer tool
32 Transfer groove
34 Transfer web
36 Parting line
38 Insertion mandrel
100 Stator or rotor
110 Stator or rotor groove
112 Groove base
114 Cover slide part

The invention claimed is:

1. A method for introducing insulated winding packets into stator or rotor grooves, comprising the following method steps:
   inserting insulating layers into transfer grooves of a transfer tool, wherein each of the insulating layers includes sections and at least one section of each of the insulating layers lies radially outside of a respective transfer groove;
   transferring wire webs of the winding packets into the transfer grooves;
   closing the insulating layers by folding the sections in a direction of the wire webs of the winding packets and fixing the sections in a folded position to form folded sections of the insulating layers; and
   inserting the winding packets into a respective stator or rotor groove such that the folded sections are arranged between groove bases of the stator or rotor grooves and the wire webs of the winding packets.

2. The method according to claim 1, wherein the sections are fixed in the folded position via a fixing means.

3. The method according to claim 1, wherein when the insulating layers are closed, two of the sections are folded in an overlapping manner.

4. The method according to claim 1, wherein all wire webs of a respective winding packet are surrounded by a respective insulating layer in a respective transfer groove before the winding packets are inserted.

5. The method according to claim 1, wherein the insulating layers are inserted in the transfer grooves in such a way that the sections of a respective insulating layer alternately at least partially overlap on radial outer sides of transfer webs arranged between the transfer grooves.

6. The method according to claim 1, wherein the insulating layers are formed from an endless material which radially surrounds transfer webs and the transfer grooves of the transfer tool on all sides, the transfer webs being arranged between the transfer grooves.

7. The method according to claim 6, comprising the method step of:
   separating the endless material in an area of the transfer webs respectively.

8. The method according to claim 1, wherein the transfer tool has a cylindrical shape with radially outwardly open transfer grooves, and, between the transfer grooves, transfer webs are arranged, wherein a parting line is arranged on a radially outer side of the transfer webs.

9. A method for introducing insulated winding packets into stator or rotor grooves, the method comprising:
   inserting an insulating layer into a transfer groove of a transfer tool, wherein the insulating layer includes two sections and at least one of the two sections lies radially outside of the transfer groove;
   transferring wire webs of a winding packet into the transfer groove such that the insulating layer is arranged between the wire webs and the transfer groove;
   closing the insulating layer by folding the two sections in a direction of the wire webs and fixing the two sections in a folded position to form a folded section of the insulating layer; and
   inserting the winding packets into a stator or rotor groove such that the folded section of the insulating layer is arranged between a groove base of the stator or rotor groove and the wire webs of the winding packets.

10. The method according to claim 9, wherein a thickness of the insulating layer is in a range of 0.12 to 0.15 mm.

* * * * *